F. W. LANG.
JOINT PROTECTOR FOR SEWER PIPES.
APPLICATION FILED JULY 7, 1910.
985,182.
Patented Feb. 28, 1911.
Fig. 1.
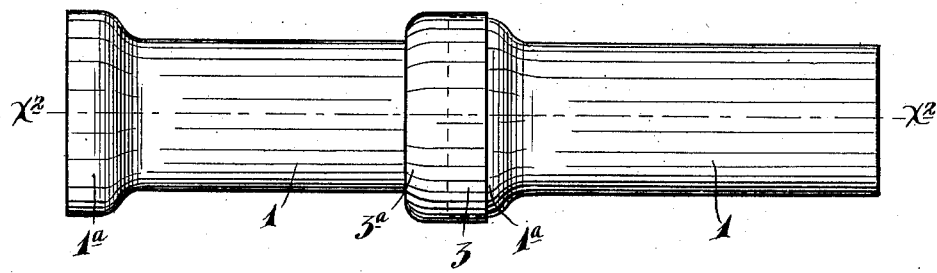
Fig. 2.
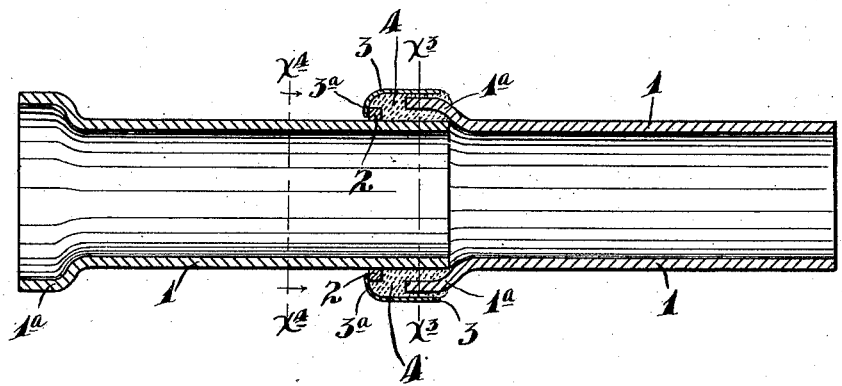
Fig. 3.       Fig. 5.       Fig. 4.
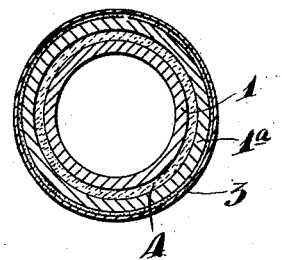 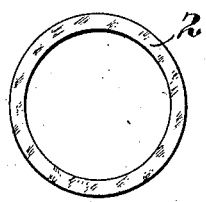 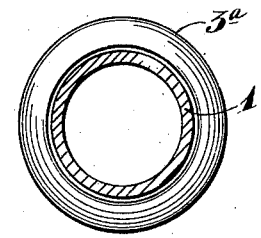
Witnesses.
Harry Opsahl.
E. C. Skinkle
Inventor:
Frederick W Lang.
By his Attorneys.
Williamson & Merchant

UNITED STATES PATENT OFFICE.

FREDERICK W. LANG, OF MINNEAPOLIS, MINNESOTA.

JOINT-PROTECTOR FOR SEWER-PIPES.

985,182.  Specification of Letters Patent.  Patented Feb. 28, 1911.

Application filed July 7, 1910. Serial No. 570,745.

*To all whom it may concern:*

Be it known that I, FREDERICK W. LANG, a citizen of the United States, residing at Minneapolis, in the county of Hennepin and State of Minnesota, have invented certain new and useful Improvements in Joint-Protectors for Sewer-Pipes; and I do hereby declare the following to be a full, clear, and exact description of the invention, such as will enable others skilled in the art to which it appertains to make and use the same.

My invention has for its object to provide an improved joint for sewer pipes and similar conduits which are made of pipe sections having loosely telescoped ends, and to this end the invention consists of the novel devices and combination of devices hereinafter described and defined in the claim.

As is well known, sewer pipes are usually made up of sections connected by loosely telescoped end joints which not only leak water, but permit the roots of trees, in their search for moisture, to grow and work their way between the joints and into the pipe sections, so that finally the sewer pipes become clogged with roots and materials collected thereby.

My invention provides an extremely simple and efficient device of small cost, by the use of which the joints of sewer pipes and similar conduits may be made tight and thereby prevent roots from growing into or through the joints between the pipe sections.

In the accompanying drawings, which illustrate the invention, like characters indicate like parts throughout the several views.

Referring to the drawings: Figure 1 is a plan view showing two sections of sewer pipe and illustrating my improved joint connection or guard applied thereto. Fig. 2 is a longitudinal section taken on the line $x^2$ $x^2$ of Fig. 1. Fig. 3 is a transverse section taken on the line $x^3$ $x^3$ of Fig. 2. Fig. 4 is a transverse section taken on the line $x^4$ $x^4$ of Fig. 2, and Fig. 5 is a detailed view in side elevation showing a packing ring used in the improved joint.

The sewer pipe sections 1 are provided with enlarged ends $1^a$ that telescope loosely over the small ends of adjacent pipe sections in the customary way.

The numeral 2 indicates a pliable packing ring preferably of lead and which is of such size that it will snugly fit the small end of the pipe section, and being of pliable material, such as lead, will adapt itself to any irregularities in form of the pipe. The sewer pipe sections, as is well known, are quite irregular and not always of cylindrical form and hence, the pliable packing ring is an important feature. This pliable metal packing ring will also stretch slightly to fit a slightly enlarged portion of the pipe, or it may be hammered down and made to fit a smaller portion of the pipe.

The numeral 3 indicates an annular shield preferably of sheet metal, the body of which is adapted to loosely fit around an enlarged end $1^a$ of the pipe section, and is provided with an inturned flange $3^a$, at one end, which loosely fits around the body of the adjacent pipe section and is engageable with the packing ring 2, as best shown in Fig. 2.

The numeral 4 indicates cement which fills the space within the annular guard plate 3 and fills the annular space between the telescoped ends of the pipes, and between the enlarged end of the pipe and the surrounding portion of the said guard or shield.

In assembling the various elements of the device, the annular shield 3 is first slipped over the small end of one of the pipe sections 1 and then the pliable packing 2 is slipped over the same end of the pipe section and placed within the shield 3.

The cement is preferably placed within the shield or guard 3 before the latter has been slid over the large end of the pipe, and then when the shield is forced out of position, as shown in Fig. 2, the cement will be crowded into all the crevices and when hardened will form a very tight joint between the pipe sections and this joint will be further protected from breakage, by means of the shield or guard 3.

What I claim is:

The combination with pipe sections, the one having a large end telescoped over the smaller end of the other, of a pliable packing ring telescoped on to the smaller pipe end, adjacent to the larger pipe ends, an annular metal shield telescoped over the said packing ring and the large pipe end, and cement contained within said shield and forming a tight joint between the pipe sections, substantially as described.

In testimony whereof I affix my signature in presence of two witnesses.

FREDERICK W. LANG.

Witnesses:
F. D. MERCHANT,
HARRY D. KILGORE.

Copies of this patent may be obtained for five cents each, by addressing the "Commissioner of Patents, Washington, D. C."